Oct. 15, 1940.    L. Y. BOOHARIN    2,217,979
APPARATUS FOR PREVENTING ICE FORMATION ON AIRPLANE SURFACES
Filed June 6, 1938
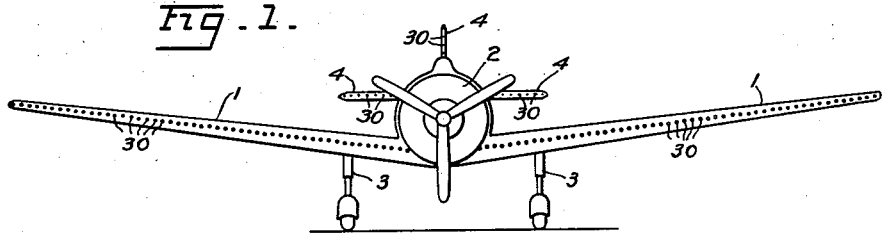
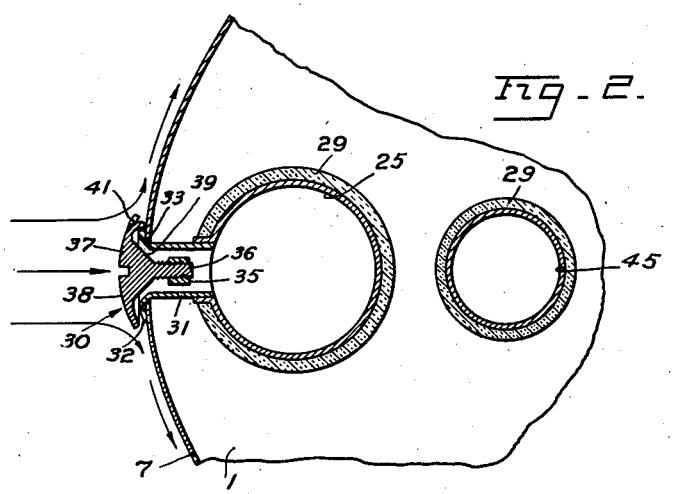
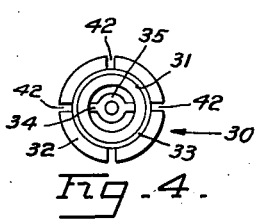
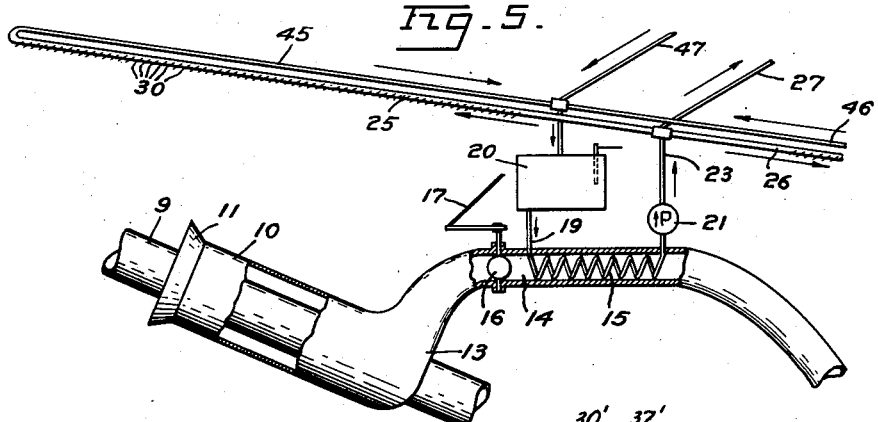
INVENTOR.
Leo Y. Booharin.

Patented Oct. 15, 1940

2,217,979

UNITED STATES PATENT OFFICE

2,217,979

APPARATUS FOR PREVENTING ICE FORMATION ON AIRPLANE SURFACES

Leo Y. Booharin, San Francisco, Calif., assignor of one-half to George Kisling, San Francisco, Calif.

Application June 6, 1938, Serial No. 212,059

2 Claims. (Cl. 244—134)

My invention relates to an apparatus for preventing ice formation on an airplane surface during flight.

It is well known that ice is apt to form on leading edges of airplane surfaces under certain weather conditions. The ice formation changes aerodynamic characteristics of said surfaces, so that the airplane becomes uncontrollable due to decrease in lifting power, and increase in drag and weight of said airplane.

The object of this invention is to provide means for preventing formation of ice on airplane surfaces while in flight, by covering the leading edges thereof with hot liquid, which prevents formation and adhesion of ice to the surfaces.

Another object of my invention is to utilize heat of the exhaust pipe or pipes of the power plant of an airplane for the heating of the ice adhesion preventing liquid.

Another object of my invention is to provide means for individual control of flow of ice adhesion preventing liquid at any point of the leading edge of an airplane surface.

Other objects and advantages will appear as the specification proceeds and the novel features of the device will be particularly pointed out in the appended claims.

My invention is illustrated in the accompanying drawing in which:

Fig. 1 is a front elevation of an airplane,

Fig. 2 is a cross-section of a leading edge of an airplane surface and through one of the liquid distributing nozzles, Fig. 3 is a front elevation of a valve of the liquid distributing nozzle, Fig. 4 is a front elevation of a nozzle without the valve, Fig. 5 is a diagrammatic view illustrating the operation of my invention, Fig. 6 is a cross-section of an airplane wing showing liquid distributing nozzles, therein, and, Fig. 7 shows modified arrangement of liquid distributing nozzles on the airplane surface.

In general my device consists of a plurality of jets or nozzles located in the leading edge of an airplane surface and adapted to emit, and spread upon said surface, liquid, such as various oils, which prevents adhesion of ice to said surface. To enhance the anti-adhesion action of said liquid, I prefer to heat the same, preferably utilizing for that purpose heat generated by the motor. Liquid to be used for such purpose should have low freezing temperature in order to be fluid and readily spreading over the surface of the plane and to have high boiling temperature in order to withstand heating to a comparatively high degree.

The nozzles are so designed that the stream of air passing therearound draws oil therefrom and spreads it over the surface. As no pressure is needed to discharge liquid through the nozzles, the conduits which deliver said liquid to the nozzles do not need to withstand any pressure and therefore need not be made of heavy gauge material, which is of great importance in an airplane, as it saves considerable weight. A controllable pump delivers heated liquid into the conduits only when the pilot so desires.

In detail, Fig. 1 shows a conventional monoplane, having wings 1, a power plant 2, a landing gear 3, and tail surfaces 4. The wings 1, as well as the tail surfaces 4 are covered with metal, plywood or other covering 7. An exhaust pipe 9 leads heated gases away from the power plant 2. The parts so far described are standard in any conventional airplane.

My device consists of a jacket 10 built around the exhaust pipe 9 and having an open flared out front end 11. The rear end 13 of the jacket 10 is closed and formed integral therewith is a hot air pipe 14 leading away from said jacket. The pipe 14 houses a coil 15, and a butterfly valve 16 is interposed in said pipe 14 between the jacket 10 and said coil. The butterfly valve 16 is operable by means of a lever and connecting links 17, and is intended to regulate or entirely restrict flow of hot air around said coil.

One end of the coil 15 is connected by a pipe 19 with a storage tank 20 where the ice adhesion preventing liquid is stored, and the other end thereof to a pump 21, which may be of any type and is controllable by a pilot. A pipe 23 connects the pump 21 with conduits 25, 26, and 27. The conduits 25 and 26 are located in the wings 1, in close proximity to the leading edge thereof, and the conduit 27 leads to tail surfaces 4. All conduits are preferably covered with heat insulating material 29 to prevent cooling of liquid.

Whenever in the judgment of a pilot there is danger of ice forming on the airplane surfaces, the pilot opens the butterfly valve 16, whereupon hot air heats liquid in the coil 15. A few moments later the pilot starts the pump 21 and hot liquid is forced into conduits 25, 26, and 27 for distribution upon various surfaces, which is done by plurality of nozzles 30.

Each nozzle 30 consists of a short cylindrical body 31 connected to one of the said conduits 25, 26, and 27, and projecting slightly beyond the covering 7 of the leading edge of the airplane surfaces. The outer end of the body 31 is flared out so as to form a conical outlet 33 and has a circular rim 32 therearound.

The body 31 has a web 34 arranged therein and supporting a central threaded bushing 35 into which a stem 36 of an adjusting valve 37 is screwed. The adjusting valve 37 has a slightly convex outer surface 38 and a conical inner surface 39. It is obvious that a circular passage between said surface 39 and the conical outlet surface 33 of the body 31 may be readily and minutely adjusted to suit flow of fluid at any place on the surface by screwing the valve 37 in or out. The valve 37 can be easily locked in the desired position by a finger 41, formed out of the body of the valve and adapted to be bent into one of the notches 42 provided for such purposes on the outer rim 32 of the body 31.

Air stream flows around the valve 37 as shown by the arrows and creates suction at the outer end of the outlet 33, thereby drawing the liquid from the conduits 25, 26, and 27 and spreading it around the valve on the leading edge surfaces 1 and 4.

The conduits 25, 26, and 27 extend the full length of the surfaces and the excess of liquid is carried back to the storage tank 20 by the returning conduits 45, 46, and 47, thus completing the circle.

Fig. 7 shows a modified arrangement of the nozzles 30 which may be used on big modern ships having wings of great thickness. In such case one row of centrally located nozzles may be insufficient to properly cover the whole leading edge of a wing by ice adhesion preventing liquid. Therefore double or triple rows of nozzles 30 may be provided. The valves 37' of the nozzles 30' have their sides facing the air stream bent downwardly to prevent blowing in of liquid by said air stream.

Having thus described my invention I claim:

1. A combination of an airplane having supporting surfaces, a motor, and an exhaust pipe, with a tank for ice adhesion preventing liquid; a jacket around the exhaust pipe; a hot air pipe leading from said jacket; a coil within said pipe one end of which is connected to said tank; a pump connected to the other end of the coil; conduits leading from said pump and located in the said surfaces; a plurality of nozzles carried by said conduits, each nozzle terminating at the leading edge of said surfaces and adapted to spread said liquid thereover.

2. The combination of an airplane having supporting surfaces, a motor and an exhaust pipe; with a tank for ice adhesion preventing liquid; a coil, one end of which is connected to the tank; controllable means connected with the exhaust pipe for heating air and directing the same onto said coil; a pump connected with the other end of the coil; conduits leading from said pump to said surfaces; and means connected with said conduits for spreading said liquid over said surfaces.

LEO Y. BOOHARIN.